United States Patent [19]

Hicks

[11] Patent Number: 5,129,178

[45] Date of Patent: Jul. 14, 1992

[54] TUBULAR FISHING FLOAT

[76] Inventor: Thomas W. Hicks, 3544 Kingsboro Rd. NE., Atlanta, Ga. 30319

[21] Appl. No.: 619,234

[22] Filed: Nov. 28, 1990

[51] Int. Cl.$^5$ ............................................. A01K 91/00
[52] U.S. Cl. ................... 43/44.87; 43/44.92; 43/44.94
[58] Field of Search ............... 43/44.87, 44.9, 44.92, 43/44.94, 44.95, 42.22

[56]  References Cited

U.S. PATENT DOCUMENTS

| | | | |
|---|---|---|---|
| 943,450 | 12/1909 | Owens | 43/44.94 |
| 2,802,294 | 8/1957 | Litwin | 43/42.22 |
| 2,842,886 | 7/1958 | Williams | 43/44.87 |
| 3,011,285 | 12/1961 | Musser | 43/44.87 |
| 3,303,598 | 2/1967 | Spindler | 43/44.9 |
| 3,977,115 | 8/1976 | Check | 43/43.11 |

FOREIGN PATENT DOCUMENTS

| | | | |
|---|---|---|---|
| 723782 | 10/1931 | France | 43/44.92 |
| 1540909 | 10/1968 | France | 43/44.93 |

OTHER PUBLICATIONS 6 specimens of fishing floats as represented by photograph being commercially available prior to Nov. 28, 1989.
Hicks, Inc. catalog pages showing fishing floats commercially available prior to Nov. 28, 1989.

Primary Examiner—Richard K. Seidel
Assistant Examiner—Patty E. Hong
Attorney, Agent, or Firm—Louis T. Isaf

[57] ABSTRACT

A tubular fishing float which, in the preferred embodiment, includes at least one extended tubular center section and two end sections, which end sections seal the center section to form an air-tight compartment which provides buoyancy. The end sections include devices for attaching the fishing line to the fishing float and for providing drag on the fishing line; such devices include one or more of pig-tails, holes, or slits. One alternate embodiment includes a slotted sleeve which attaches the fishing line to the tubular float and provide extra weight. Another embodiment includes a plurality of tubular fishing floats attached to one another to increase buoyancy and/or to improve visibility. Another embodiment includes a hollow cylinder and two end plugs which are insertable into the hollow cylinder to form an air-tight compartment. A double-tube fishing float includes two tubular center sections attached to a center connection section which biases the two tubular sections together to wedge around a fishing line. This embodiment includes an open cylindrical center section attached to the center connection section which is adaptable to cooperation with a knot on the fishing line to enable efficient deep water operation. Another embodiment includes a flange attached to and biased around the center section to grip the fishing line.

11 Claims, 5 Drawing Sheets

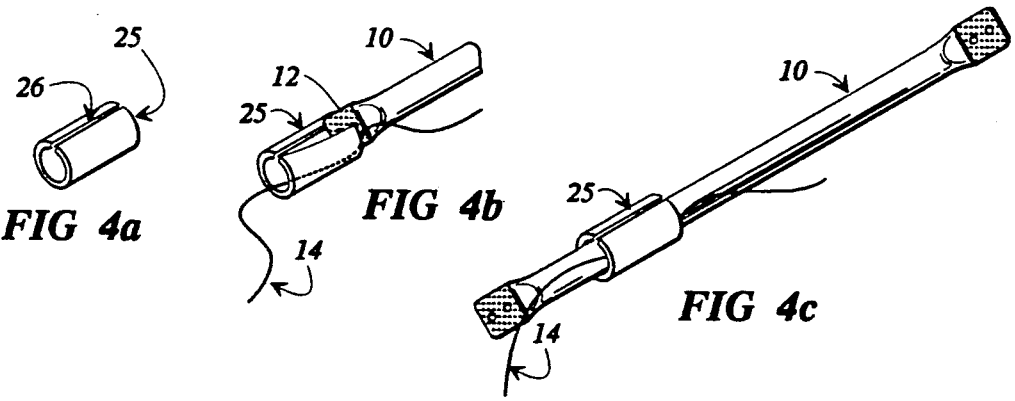
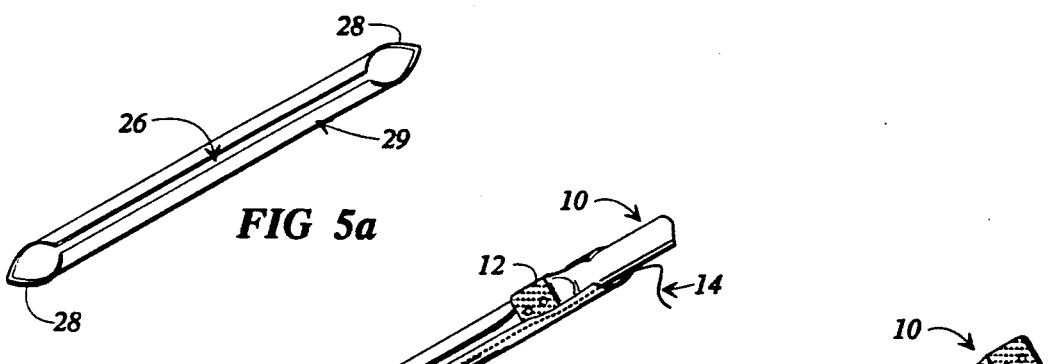
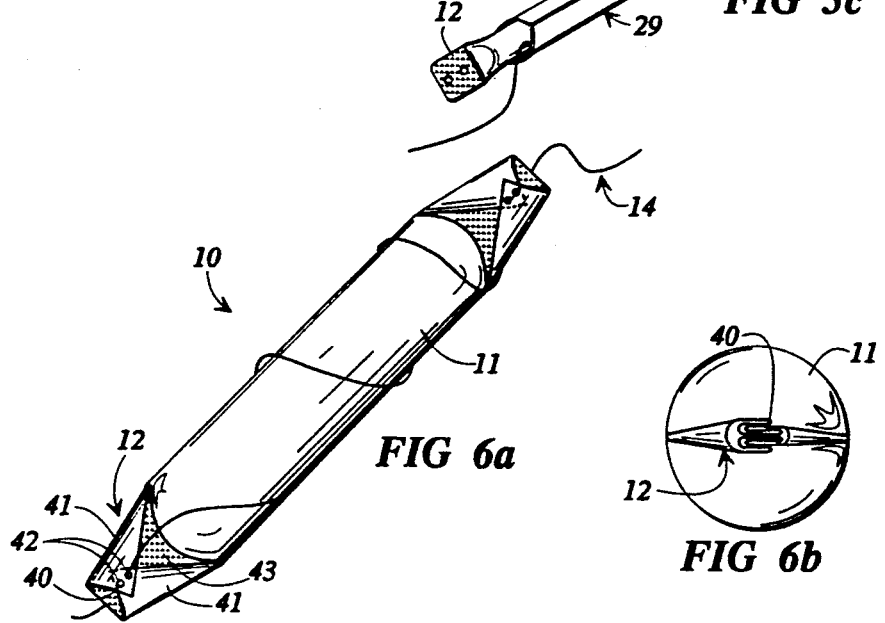

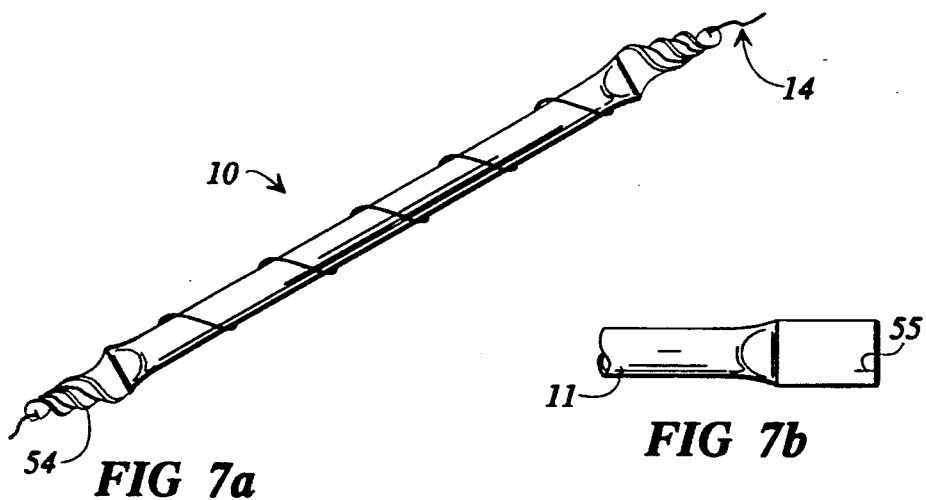
FIG 7a
FIG 7b
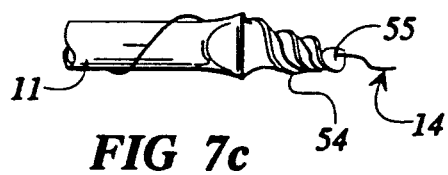
FIG 7c
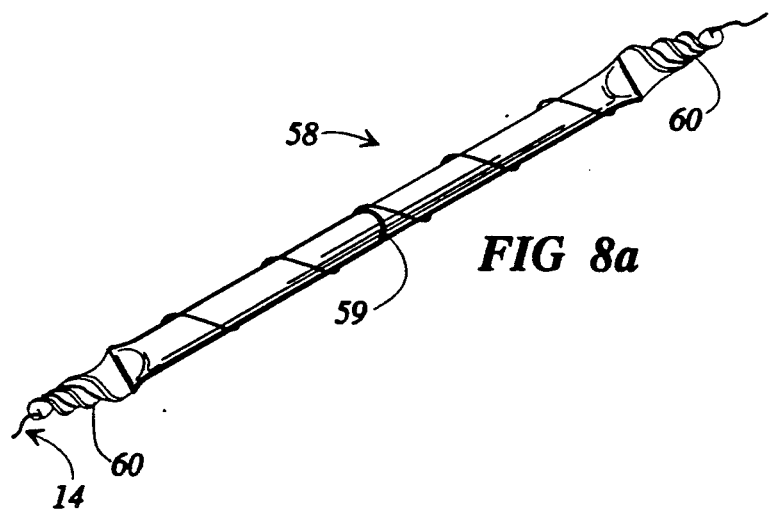
FIG 8a
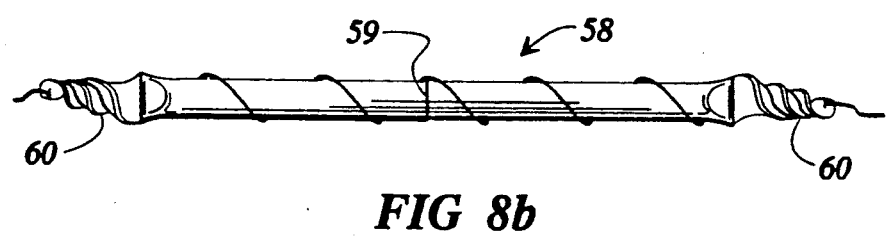
FIG 8b

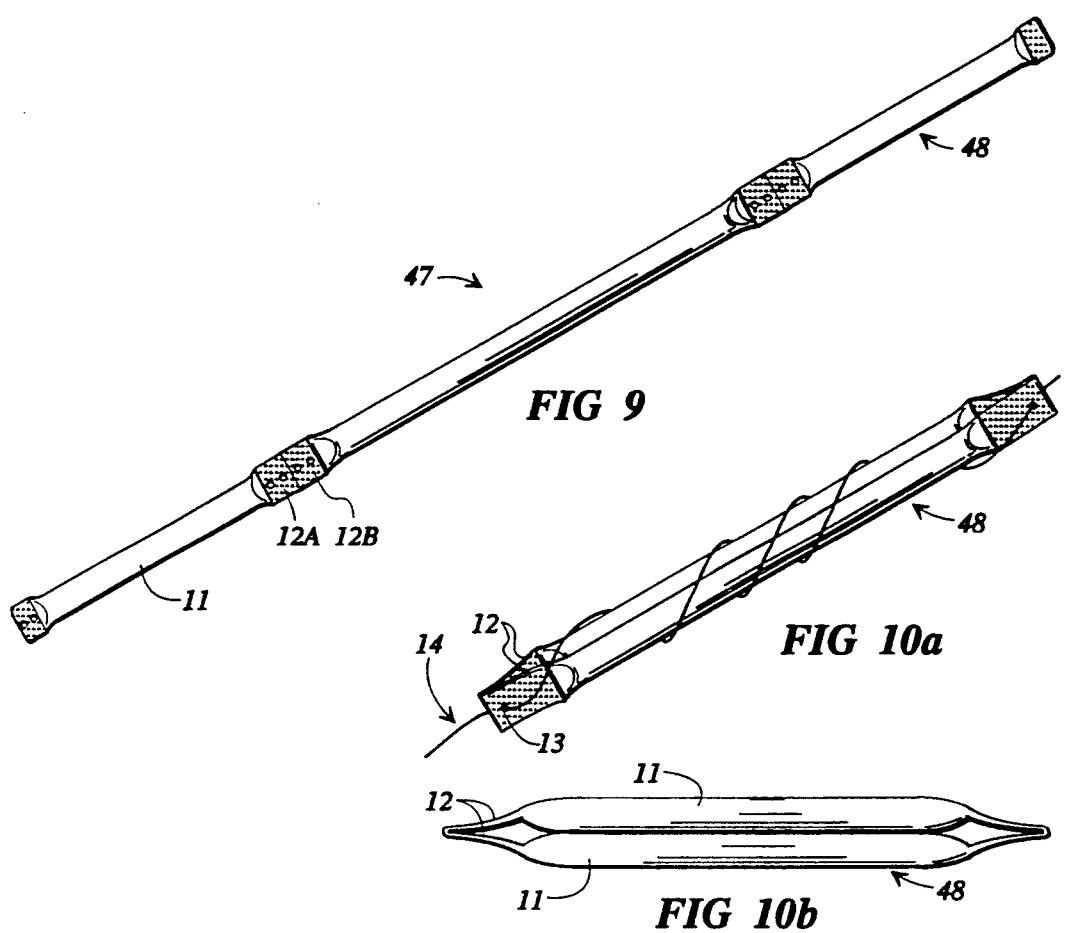
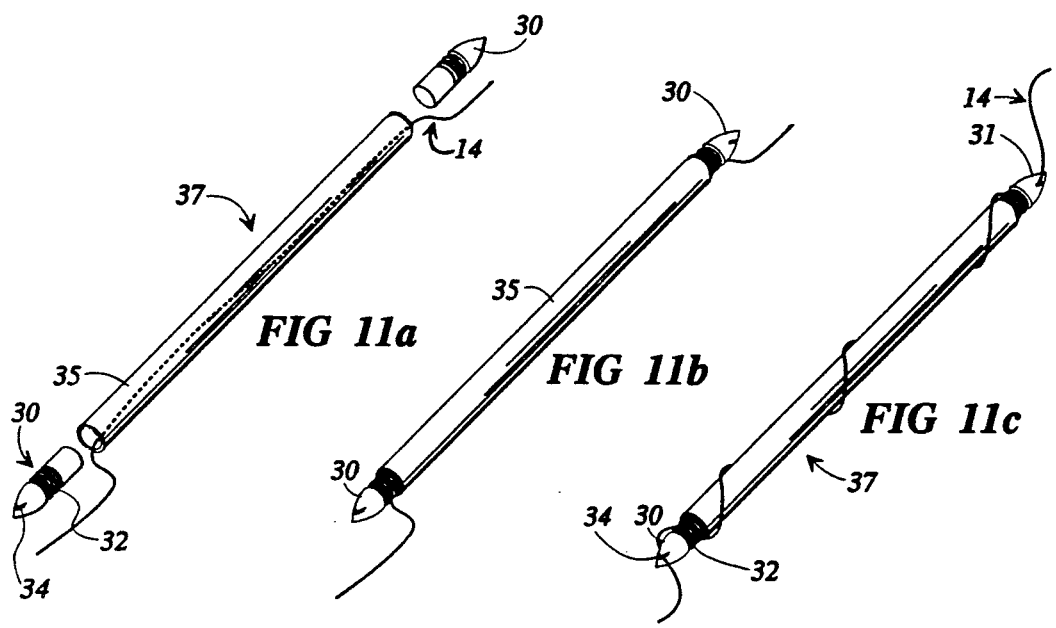

TUBULAR FISHING FLOAT

FIELD OF THE INVENTION

The present invention relates generally to the field of fishing equipment, and more specifically, to the field of fishing floats attachable to fishing lines.

BACKGROUND OF THE INVENTION

Fishing floats have been used by fisherman for many years. Fishing floats are most often used to suspend live bait between the top of the water and the water bottom, making the bait more attractive to certain types of fish. Because water depths are not constant and fisherman customarily fish in various locations, fishing floats which are not easily moved to different positions along the fishing line are inconvenient to use. One type of float exhibiting this problem has a wire loop through which the fishing line is threaded and near which so-called "BB" sinkers are clamped onto the fishing line to secure the location of the float. This process is very time consuming and not amenable to rapid fishing float position changes.

Another type of fishing float currently used by fishermen is constructed of cork, or styro-foam, and includes a central passageway through which the fishing line is threaded. A small piece of plastic or wood is wedged into one side of the passageway to position the fishing float at a particular location on the fishing line. This wedge piece often falls out of the hole and is lost. Consequently, the fisherman must then search for another twig or piece of wood to substitute for the original wedge piece. Undersized substitutes often fail to adequately secure the float in one position, and oversized substitutes often damage the relatively soft material of the fishing float.

Fishermen often fish in great depths with the aid of casting rods. It is often desirable to avoid positioning the fishing float for this great depth before the casting is performed because of various accuracy and safety concerns associated with beginning one's cast with more than three or four feet of fishing line extending from the tip of the rod. To avoid these problems, fishing floats which are capable of continually sliding up and down the line, such as the wire-loop fishing float and the cork fishing float discussed above, are often used in combination with an appropriately located knot on the fishing line composed of string or rubber band which will not pass through the fishing float but will pass through the eyes of the rod and into the reel. As the rod is cast out and the hook and sinker begin to sink, the fishing float rises along the line until it reaches the knot and stops the hook and sinker from sinking further. A bead in the line may also be used between the knot and fishing float if the knot is too small to stop the fishing float. This method is seen in U.S. Pat. No. 3,011,285.

Another very common type of fishing float currently used by fisherman is constructed of plastic in the form of an air-tight sphere with a small retractable cylinder attached. This type of fishing float is often painted red and white. The cylinder is spring loaded and cooperates with a wire to enable the fisherman to attach the fishing line to the top and bottom of the fishing float. If this type of fishing float is dropped onto a very hard surface, it tends to break and is no longer air-tight. Also, the wire and spring may rust after prolonged usage. Furthermore, the method of attaching and subsequently moving the fishing float along the fishing line is not intuitively obvious. Finally, the number of parts used and the relatively large expense involved in manufacturing are disadvantages of this type of fishing float. There is, therefore, a need in the art to provide solutions to these and other serious problems.

BRIEF SUMMARY OF THE INVENTION

Briefly described, the present invention, in its preferred embodiment, includes a tubular fishing float which includes at least one extended tubular center section and two end sections which seal the center section to form an air-tight compartment which provides buoyancy. The end sections include devices for attaching the fishing line to the fishing float, such as holes or slits. One method of manufacturing the present invention includes first extruding a hollow cylinder of plastic which resembles a drinking straw. Each end of the cylinder is then pressed together, sealed, and knurled. One or more holes or slits are then but into each end section to provide a devices for attaching a fishing line. In one method of usage, the fishing line is wrapped around the center section to increase the drag, thus increasing the fishing float's grip on a particular position of the fishing line.

In an alternate embodiment, a slotted sleeve is used as an element of the present invention to provide an alternate devices for attaching the fishing line to the tubular float. The fishing line is inserted into the slotted sleeve, and the tubular fishing float is then inserted into the slotted sleeve which secures the tubular fishing float to the fishing line quickly and easily. This slotted sleeve, in one embodiment, provides extra weight to increase the length of a cast or cause the fishing float to stand up in the water.

The end sections of the preferred embodiments of the tubular fishing flat take on various shapes in alternate embodiments. One embodiment includes folded end sections folded which increase the strength of the end sections. If a very large fish is caught, the fishing line will tear through the attachment holes if the holes are cut through only two layers of material. By folding the end sections, more layers of material are used to strengthen the attachment holes. Furthermore, the diameter of the tubular center section is variable to accommodate heavy bait and/or sinkers. Another embodiment includes pig-tailed end sections which increases drag and are flexible to resist damage.

Another embodiment includes tubular fishing floats attached to one another to increase buoyancy and/or to improve visibility. If they are attached in a front-end to back-end arrangement, the combination becomes very long and can be seen from a greater distance. This arrangement is accomplished by first constructing one long tube and then simply pressing seals and cutting holes and/or slits at various points along the tubing. In this manner, the fisherman is allowed to cut the long fishing float to the desired length. Another arrangement of the tubular fishing floats includes attaching the floats front-end to front-end, i.e., side-by-side, for greater buoyancy.

Another alternate embodiment includes two end plugs which are insertable into a hollow cylinder to form an air-tight compartment. The fishing line is threaded through the cylinder until the cylinder is positioned at the desired location. The end plugs are then inserted into the cylinder to both create the air-tight compartment and secure the cylinder to the desired location on the fishing line. Alternately, the plugs are first inserted into the cylinder, and the fishing line is wrapped around the cylinder and attached to the end sections.

Another embodiment includes a double-tube fishing float. Two tubular center sections are attached to a center connection section which biases the two tubular sections together. The fishing line is wedged between the tubular sections which secure the double-tube fishing float to a particular position along the fishing line. The tubular center sections include an axial ridge and recess to improve this gripping function. An open cylindrical center section is also attached to the center connection section and is adaptable to cooperation with a fishing line knot as is discussed above. Furthermore, end sections include devices for attaching the fishing line when additional gripping capabilities are needed.

A final embodiment includes a tubular fishing float similar to that of the preferred embodiment with an additional flange attached to, and molded around, the tubular center section. This flange is biased against the tubular center section but is shaped to allow a fishing line to be placed between the flange and the tubular center section. Because of this bias, a fishing line placed in this position is gripped by the float.

It is therefore an object of the present invention to provide a tubular fishing float which includes an extended tubular center section and two end sections which enclose the center section and provide devices for attaching a fishing line to the tubular fishing float which is adaptable to rapid attachment and rapid adjustment.

Another object of the present invention is to provide a tubular fishing float which includes a tubular center section and end sections which enclose the center section to form an air-tight compartment to provide buoyancy.

Another object of the present invention is to provide a tubular fishing float which includes a slotted outer sleeve removably connected around a tubular center section between two end sections wherein the slotted outer sleeve secures the fishing float to the fishing line.

Another object of the present invention is to provide a tubular fishing float which includes a tubular center section with an air-tight compartment and end sections which include holes cut through folded sections to provide increased strength to the holes.

Yet another object of the present invention is to provide a tubular fishing float which includes a tubular center section and end sections which are turned in the form of pig-tails and further include slits.

Still another object of the present invention is to provide a combination of tubular fishing floats attached together, increasing buoyancy and visibility.

Still another object of the present invention is to provide a tubular fishing float which includes a hollow cylindrical member and two end plugs which form an air-tight compartment within said cylindrical member when placed in the ends of the cylindrical member.

Still another object of the present invention is to provide a tubular fishing float which includes two enclosed tubular center sections connected to a center connection section and are biased against each other to grip an interposed fishing line.

Still another object of the present invention is to provide a tubular fishing float which includes two enclosed tubular center sections and an open cylindrical section through which fishing line freely passes.

Still another object of the present invention is to provide a fishing float which is simple in design, inexpensive to manufacture, rugged in construction, easy to use, and efficient in operation.

Still another object of the present invention is to provide a fishing float which is sensitive to light fish bites, provides good visibility to the fisherman, and provides indication that the fishing tackle is on the water bottom.

Other objects, features and advantages of the present invention will become apparent upon reading and understanding the present specification, when taken in conjunction with the accompanying drawings.

BRIEF DESCRIPTION OF THE DRAWINGS

FIG. 1b is a side elevational view of the preferred embodiment of FIG. 1a.

FIG. 1c is a top view of the preferred embodiment of FIG. 1a.

FIG. 4a is a perspective view of a slotted outer sleeve.

FIG. 4b is a perspective view of a tubular fishing float being inserted into a slotted outer sleeve through which a fishing line is threaded.

FIG. 4c is a perspective view of a slotted outer sleeve attached around a tubular fishing float and securing the tubular fishing float to a fishing line.

FIG. 5a is a perspective view of a long slotted outer sleeve with angled ends.

FIG. 5b is a perspective view of a tubular fishing float being inserted into a long slotted outer sleeve through which a fishing line is threaded.

FIG. 5c is a perspective view of a long slotted outer sleeve attached around a tubular fishing float and securing the tubular fishing float to a fishing line.

FIG. 6a is a top view of a large tubular fishing float with folded end sections.

FIG. 6b is an end view of the large tubular fishing float shown in FIG. 6a.

FIG. 7a is a perspective view of a tubular fishing float with spin-welded, pig-tail end sections.

FIG. 7b is a top view of an end section of the fishing float shown in FIG. 7a before the end section is spin-welded.

FIG. 7c is a top view of the end section shown in FIG. 7b after it is spin-welded and a fishing line is attached.

FIG. 8a is a perspective view of a blow-molded tubular fishing float with pig-tail end sections.

FIG. 8b is a side elevational view of the blow-molded tubular fishing float shown in FIG. 8a.

FIG. 9 is top view of a combination of tubular fishing floats connected front-end to back-end.

FIG. 10a is a perspective view of a combination of tubular fishing floats connected front-end to front-end.

FIG. 10b is a side elevational view of the combination shown in FIG. 10a.

FIG. 11a is a perspective view of an alternate embodiment of the present invention which includes a hollow cylindrical member and two end plugs shown unassembled.

FIG. 11b is a perspective view of the alternate embodiment of FIG. 11a shown assembled with a fishing line running through the hollow cylindrical member.

FIG. 11c is a perspective view of the embodiment of FIG. 11a with a fishing line wrapped around the hollow cylindrical member.

FIG. 13a is an end view of the first stage of construction of a flanged tubular fishing float as it is extruded.

FIG. 13b is a perspective view of the first stage of construction of the flanged tubular fishing float shown in FIG. 13a.

FIG. 13c is a perspective view of the second stage of construction of the flanged tubular fishing float shown in FIG. 13a.

FIG. 13d is a side view of the third stage of construction of the flanged tubular fishing float shown in FIG. 13a.

DETAILED DESCRIPTION OF THE PREFERRED EMBODIMENT

Figure 1A:
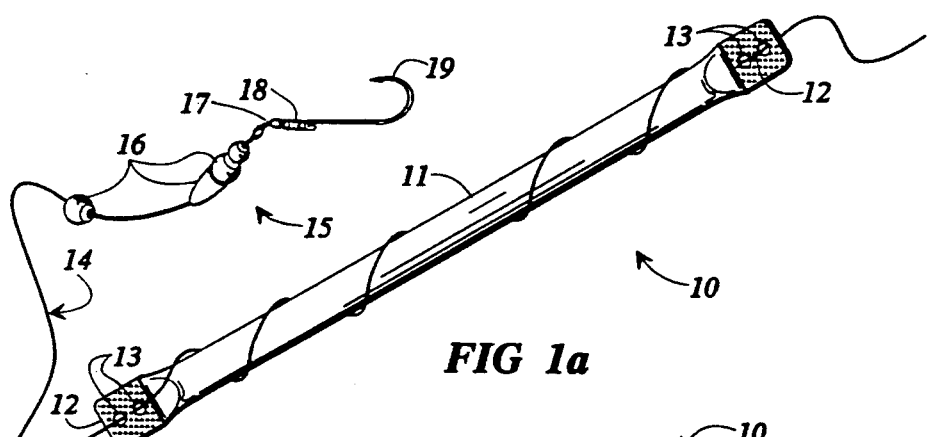
FIG. 1a is a pictorial view of a preferred embodiment of a tubular fishing float attached to a fishing line and fishing tackle.

Referring now in greater detail to the drawings in which like numerals represent like components throughout the several views, FIG. 1a shows a pictorial view of a preferred embodiment of a tubular fishing float 10 attached to a fishing line 14 along with fishing tackle 15. Fishing tackle 15 is seen including hook 19, quick release connector 18, swivel 17, and sinkers 16. The operation of fishing tackle 15 is considered understood by those skilled in the art of fishing. Fishing line 14 is seen threaded through both attachment holes 13 of each end section 12 and wrapped around center section 11 of tubular fishing float 10.

The present invention is constructed by first forming a hollow, open-ended cylinder. This step is accomplished through the common extrusion method which extrudes a continuous cylinder as is known in the art and normally used in the manufacture of ordinary plastic drinking straws. This method is well-known and relatively inexpensive. One acceptable example of material used in this construction is durable plastic. Alternately, a ribbon method which forms a stronger spiral straw is used. This method, normally involving mylar, is also well-known in the art. The method used in the construction of the apparatus of the present invention is considered unique.

In accordance with the present invention, after a hollow cylinder is constructed, end sections 12 are formed on both sides of a center section 11 by sealing both ends of the hollow cylinder to create an air-tight compartment. This step involves one or more of various well-known sealing procedures which utilize pressure and a variety of sound, heat, or radio-waves. During this procedure, the surfaces of the end sections 12 are knurled to help ensure the integrity of the seals. The next step involves constructing a device for attaching fishing line 14 to tubular fishing float 10. As shown in FIG. 1, a first attachment device includes two attachment holes 13 in each end section 12. A piercing instrument, such as a hot needle, is inserted into each end section 12 to cut attachment holes 13. The use of other devices capable of cutting attachment holes 13, such as lasers, is also considered within the scope of the invention. After the attachment device is constructed, the simple and inexpensive process for constructing this preferred embodiment is complete.

The operation of this preferred embodiment involves first threading fishing line 14 through one set of attachment holes 13, around center section 11 for a desired number of revolutions, and through the second set of attachment holes 13. Fishing tackle 15 is then attached as is known in the art. The location of tubular fishing float 10 is easily changed by grabbing a portion of fishing line 14 between end sections 12. Fishing line 14 is then pulled from the side of fishing tackle 15 is the depth is set too great, and vice-versa if the depth is set too small. The slack is then taken out of fishing line 14 by moving tubular fishing float 10 in the desired direction. This process is repeated until tubular fishing float 10 is set to the desired depth.

As fishing line 14 is cast out, the aerodynamic shape of tubular fishing float 10 avoids unduly shortening the distance of the cast. When tubular fishing float 10 is in the water, it will not float erect unless fishing tackle 15 is off the water bottom. Even if it is off the bottom, fishing tackle 15 must be heavy enough to pull one end section 12 below the water level. When erect, tubular fishing float 10 may be seen from afar. This visibility is improved by adding brightly colored paint or fluorescent designs. The cylindrical shape of tubular fishing float 10 offers little resistance to being pulled under when a fish strikes, providing sensitivity to light bites. Furthermore, a lateral strike on the bait will cause tubular fishing float 10 to fall to a horizontal position and/or submerge beneath the water level, thus "flagging" the fisherman of a strike.

Figure 1B:
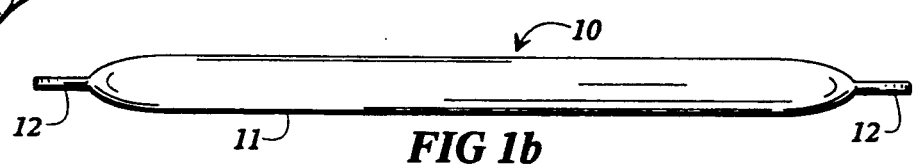
Figure 1C:
Figure 2A:
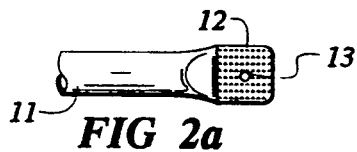
FIGS. 2a-2f are top views of alternate end sections of the present invention.
Figure 2B:

Further references to elements shown only in FIG. 1a are considered directed to FIG. 1a. FIGS. 1b and 1c show side elevational and top views, respectively, of the preferred embodiment of FIG. 1a. The number of attachment holes 13 and the number of revolutions around center section 11 taken by fishing line 14, as shown in FIG. 1a, affect the drag placed upon fishing line 14. The greater the number of attachment holes 13 and rotations around center section 11, the greater the drag on fishing line 14. Clearly, drag is necessary to prevent fishing tackle 15 from falling to the water bottom if fishing line 14 were able to slide through tubular fishing float 10. Various embodiments of end sections 12 are seen in FIGS. 2a–2f and FIGS. 3a–3f. FIGS. 2a and 3a show an embodiment wherein only one attachment hole 13 per end section 12 is shown. Although one attachment hole 13 offers less drag than two attachment holes 13, light-weight fishing tackle 15 and/or a large number of fishing line 14 rotations around center section 11 reduce the drag responsibility of the single attachment hole 13. FIGS. 2b and 3b show the preferred embodiment which includes two attachment holes per end section 12. The additional angle through which fishing line 14 is directed increases the drag as discussed above.

Figure 2C:
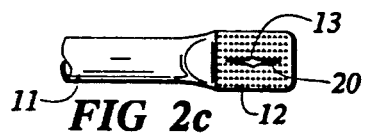
Figure 2D:
Figure 2E:
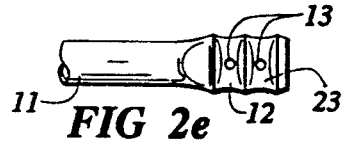
Figure 2F:
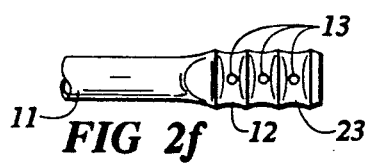
Figure 3A:
FIGS. 3a-3f are side views of alternate end sections of the present inventions corresponding to those shown in FIGS. 2a-2f.
Figure 3B:
Figure 3C:
Figure 3D:
Figure 3E:
Figure 3F:
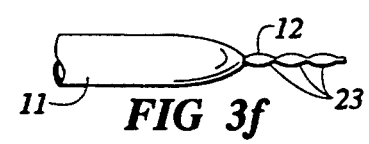

FIGS. 2c and 3c show an alternate embodiment of end section 12 which includes axial slit 20 connected to attachment hole 13. Fishing line 14 is first threaded through attachment 13 and then forced into axial slit 20 to increase the drag on fishing line 14. FIGS. 2d and 3d show edge slit 21 extending from edge section 12 and through a turn to a point at which fishing line 14 would normally remain within edge slit 21. This type of slit has the advantage of not requiring fishing line 14 to be threaded through an attachment hole 13 before fishing tackle 15 is attached to fishing line 14. Time and effort are saved should the fisherman forget this corresponding requirement for the preferred embodiment. FIGS. 2e and 3e show an embodiment of end section 12 which does not include a complete, knurled seal, but instead includes a series of line seals 22. Tubing compartments 23 are formed between each line seal 22 and resemble hills and valleys respectively. This embodiment increases the distance over which fishing line 14 must travel and increases the angle through which it must turn after exiting each attachment hole 13; therefore, the drag on fishing line 14 is increased.

With reference to FIG. 4a, a perspective view of slotted outer sleeve 25 is seen. Slot 26 is seen extending along sleeve 25. Fishing line 14 is inserted into sleeve 25 through slot 26, thus not requiring insertion before fishing tackle 15 is attached. FIG. 4b shows tubular fishing float 10 being inserted into sleeve 25. After end section 12 exits sleeve 25, tubular fishing float 10 is attached to fishing line 14 as seen in FIG. 4c. Because fishing line 14 is attached by outer sleeve 25, attachment devices on end sections 12 are not necessary. Slotted outer sleeve 25 provides a fisherman with a convenient method of very quickly attaching a fishing line 14 to a tubular fishing float 10. If he were fishing on the bottom, without a float, and then suddenly saw a fish which doesn't feed from the bottom jump into the air, there is a great need to get a float attached to fishing line 14 very quickly. Slotted outer sleeve 25 provides this ability. In one embodiment, slotted outer sleeve 25 is weighted to provide additional weight for lengthy casts or to help erect tubular fishing float 10 when fishing tackle 15 is relatively light.

Referring now to FIG. 5a, a perspective view of a long slotted outer sleeve 29 with angled ends 28 is seen. The operation of long slotted outer sleeve 29 is very similar to the operation of slotted outer sleeve 25 discussed above. Angled ends 28 allow more convenient insertion of end section 12 of tubular fishing float 10. The greater length of long slotted outer sleeve 29 provides more drag to prevent tubular fishing float 10 from slipping along fishing line 14.

Referring now to FIG. 6a, a top view of a large tubular fishing float 10 with folded end sections 12 is seen. FIG. 6b is an end view of the large tubular fishing float 10 shown in FIG. 6a. The large tubular fishing float 10 is used in fishing for large fish. The diameter of center section 11 is large to accommodate heavy fishing tackle 15. End sections 12 are folded to increase the strength of end sections 12. When very large fish are sought, large tensions on fishing line 14 might tear through attachment holes if the holes are cut through only two layers of material. By folding the end sections, more layers of material are used to strengthen the attachment holes. A portion of end section 12 is first sealed, as is indicated by sealed portion 43. The unsealed, overlapping portions 41 are then folded over sealed portion 43. Multi-layer section 40 is seen including ten layers of material. Multi-layer attachment holes 42 are then cut through multi-layer section 40. The multiple layers help prevent tearing.

Referring now to FIG. 7a, a perspective view of tubular fishing float 10 with spin-welded, pig-tail end sections 54 is shown. FIG. 7b is a top view of end section 12 of tubular fishing float 10 shown in FIG. 7a before end section 12 is spin-welded. End section 12 is first sealed and slit before it is spin-welded. Pig-tail slit 55 is seen extending from the end of end section 12. FIG. 7c shows the same portion of tubular fishing float 10 after end section 12 is spin-welded to form spin-welded, pig-tail end section 54. The method of spin-welding is considered well-known within the art. During use, fishing line 14 is wrapped around center section 11, through the grooves of pig-tail end section 54, and into pig-tail slit 55. Because no holes are used as attachment devices, quick attachment to fishing line 14 is possible even after fishing tackle 15 is already attached. As with other end section embodiments, pig-tail end section 54 and pig-tail slit 55 increase the drag on fishing line 14. Also, pig-tail end section 54 tends to absorb the force of abrupt contacts between tubular fishing float 10 and hard surfaces such as rocks and stumps, preventing damage to fishing float 10.

Referring now to FIGS. 8a & 8b, blow-molded tubular fishing float 58 is seen. FIG. 8a shows a perspective view, and FIG. 8b shows a side elevational view. This embodiment of the present invention is very similar to the embodiment shown in FIGS. 7a–7c. Fishing line 14 is seen wrapped around float 58 and into pig-tail slits 55 in much the same way as above. However, two separate air-tight compartments separated by blow-mold junction 59 and blow-molded, pig-tail end sections 60 are seen. The blow-molding process is considered well-known and will not be discussed in detail. Two globules of molten plastic are inserted into opposite ends of a blow mold which resembles the exterior of blow molded fishing float 58. An instrument is then inserted into each globule to blow air into the globule which expands to form blow-molded tubular fishing float 58. The blowing instruments are removed from the molten plastic which immediately seals the hole left by those instruments. The fishing float 58 is then cooled and removed from the mold.

Referring now to FIG. 9, a top view of a combination of tubular float members 48 connected as a front-to-back tubular float 47 is seen. Certain front-end sections 12a are connected to certain back-end sections 12b to form front-to-back tubular float 47. This combination is conveniently formed from one continuous cylinder. Seals and attachment devices are placed in the cylinder at various predetermined locations. Besides offering a longer tubular float 47 which may be seen from greater distances and support heavier fishing tackle 15, a fisherman is free to choose which amount of float is necessary for certain types of fishing. He may simply purchase the entire float and then pick which sections should remain connected to meet his fishing needs.

Referring now to FIGS. 10a and 10b, a perspective view and a side elevational view, respectively, of another combination of tubular float members 48 connected as a side-to-side tubular float 50 is seen. This type of combination increases both buoyancy and drag on fishing line 14. As shown, fishing line 14 is threaded through attachment holes 13 and around the center sections 11 of both tubular float members 48. Unlike the end sections 12 of front-to-back tubular float 47 seen in FIG. 9, all end sections 12 of side-to-side tubular float 50 are seen connected to one or more other end sections 12.

Referring now to FIGS. 11a -11c, perspective views of tubular float kit 37, including a hollow cylindrical member 35 and two end plugs 30, are seen. Tubular float kit 37 is seen unassembled in FIG. 11a. Fishing line 14 must first be threaded through cylindrical member 35 until cylinder 35 is correctly positioned at the desired location. End plugs 30 are then inserted into cylinder 30 to both create an air-tight compartment and secure cylinder 35 to the desired location on fishing line 14, as is seen in FIG. 11b. Fishing line 14 is threaded around pig-tail plug surface 32 and into plug slit 34 if desirable. This process tends to keep end plugs 30 inside cylinder 35 should they became loose. When tubular float kit 37 needs to be moved along fishing line 14, end plugs 30 are simply loosened to release drag on fishing line 14, cylindrical member 35 is moved along fishing line 14, and end plugs 30 are re-inserted.

A somewhat different use of tubular float kit 37 is seen in FIG. 11c. End plugs 30 are placed inside cylindrical member 35 without threading fishing line 14 through cylindrical member 35. Glue is used to permanently seal end plugs 30 into cylindrical member 35. During use, fishing line 14 is simply wrapped around cylindrical member 35 and pig-tail plug surfaces 32 into plug slits 34. This method provides for quick use of tubular float kit 37. In one embodiment, end plugs 30 are sized and adapted to cooperate with ordinary drinking straws. Fisherman may reuse end plugs 30 when cylindrical member 35 becomes damaged.

Figure 12A:
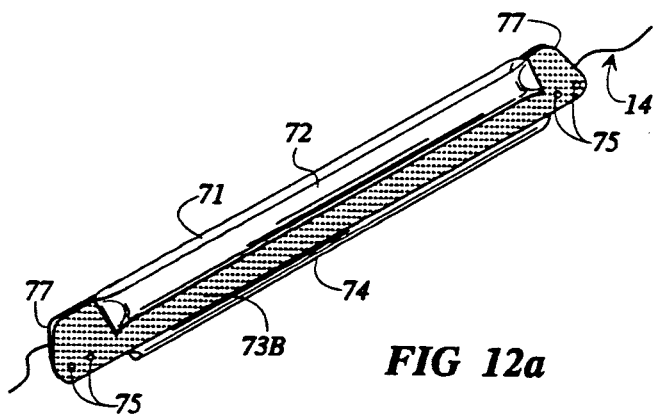
FIG. 12a is a perspective view of a double-tube fishing float further including an open tubular center section and attachment devices.

Referring now to FIG. 12a, a perspective view of double-tube fishing float 70 is seen. Convex tube 72 is seen adjacent to concave tube 71 and connected to connection section 73b. Open cylinder section 74 is also seen connected to connection section 73b. Double-tube end section 77 is seen connected to both tubes 71 and 72 and including double-tube holes 75. This embodiment offers a unique combination of options for the fisherman. Fishing line 14 is seen wedged in between concave tube 71 and convex tube 72, as well as the corresponding sections of double-tube end sections 77. This first use allows the fisherman to simply wedge fishing line 14 in between tubes 71 and 72 and begin fishing. The bias between tubes 71 and 72, along with their concave/convex nature discussed below, grips fishing line 14 to secure the location of double-tube fishing float 70.

A second option offered by double-tube fishing float 70 involves open cylinder section 74. Fishing line 14 is threaded through open cylinder section 74 which does not impede the movement of double-tube fishing float 70 up and down fishing line 14. A knot on fishing line 14, along with a bead if necessary, is used with a casting rod to access great depths efficiently, as discussed above. A third option involves double-tube holes 75 which are used to increase the drag on fishing line 14. A remainder of fishing line 14 is wedged between concave tube 71 and convex tube 72 or alternately wrapped completely around double-tube fishing float 70. Clearly, as with other embodiments, the specific type of attachment device shown, such as the two double-tube holes 75 seen in this embodiment, is also considered to include the other types of attachment devices, such as slits. Furthermore, other embodiments which do not include one or more of open cylinder section 74, double-tube holes 75, recess 78, or ridge 79 are considered within the scope of the present invention.

Figure 12B:
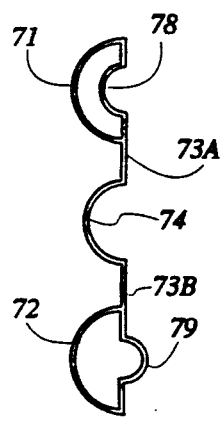
FIG. 12b is an end view of the float shown in FIG. 12a as it is extruded.
Figure 12C:
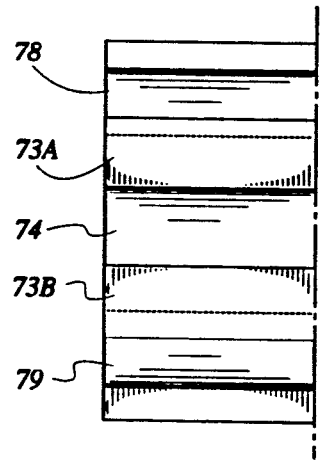
FIG. 12c is a side view of a portion of the double-tube float as shown in FIG. 12b.
Figure 12D:
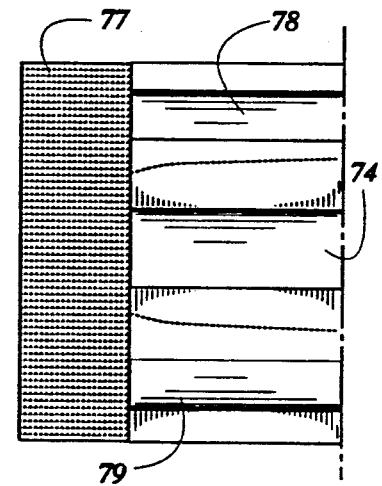
FIG. 12d is a side view of a portion of the double-tube float as shown in FIG. 12c with the first seal which encloses the tubular center sections.

The steps of manufacturing double-tube fishing float 70 are seen in FIGS. 12b–12g. Referring now to FIG. 12b, an end view of double-tube fishing float 70 as it is extruded in an unfolded position is seen. Concave tube 71 is seen with its concave tube recess which extends axially. Connection section 73a is seen connecting concave tube 71 to open cylinder section 74 before it is folded into a cylinder. Connection section 73b is seen connecting open cylinder section 74 to convex tube 72 which is seen with its convex tube ridge 79. FIG. 12c shows a side view of a portion of double-tube fishing float 70 as shown in FIG. 12b. Clearly, no seals or folds have yet been imposed on double-tube fishing float 70. The dotted lines represent edges of concave tube 71 and convex tube 72. FIG. 12d shows a side view of the same portion of double-tube fishing float 70 as shown in FIG. 12c with a first seal which encloses concave tube 71 and convex tube 72. Double-tube end section 77 is formed by this seal.

Figure 12E:
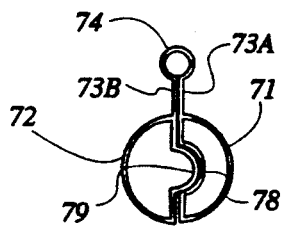
FIG. 12e is an end view of the double-tube float as shown in FIG. 12b folded over at the open cylinder section.
Figure 12F:
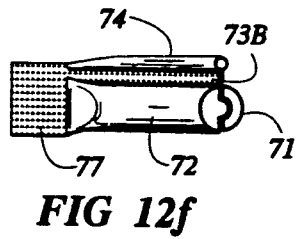
FIG. 12f is a side view of a portion of the double-tube float as shown in FIG. 12e with a second seal which encloses the open cylinder section.
Figure 12G:
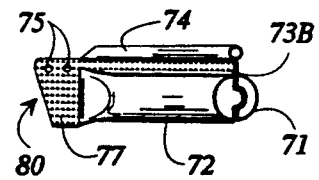
FIG. 12g is a side view of a portion of the double-tube float as shown in FIG. 12f with portions of the end section removed to open the open cylinder section and provide an attachment device in the form of two holes.

The next step involves folding double-tube fishing float 70 axially as shown in FIG. 12e. Open cylinder section 74 is now seen as a cylinder, and concave tube ridge 79 is seen fitting into convex tube recess 78. Connection sections 73a and 73b are seen adjacent to each other. The next step involves sealing connection sections 73a and 73b together, as is represented by FIG. 12f which shows a side view of a portion of the folded double-tube fishing float 70 at this point. This seal creates a bias between concave tube 71 and convex tube 72 and secures the cylindrical shape of open cylinder section 74. The final steps involve cutting portions of end section 77 away to open the ends of open cylinder section 74 and to construct double-tube holes 75. Insertion grade 80 is also cut to facilitate insertion of fishing line 14 between concave tube 71 and convex tube 72. It should be clear that when fishing line 14 is inserted between tubes 71 and 72 until connection section 73 is reached by fishing line 14, concave tube recess 78 and convex tube ridge 79 cooperate to prevent double-tube fishing float 70 from falling off of fishing line 14.

Figures 13A, 13B:
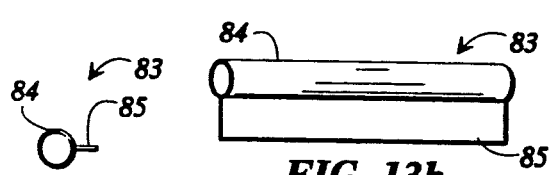

Referring now to FIG. 13a, an end view of the first stage of construction of flanged tubular fishing float 83 as it is extruded is seen. This extrusion is very similar to the extrusion of the preferred embodiment in that flange tube 84 is very similar to the hollow cylinder extruded in the preferred embodiment. The difference is found in the additional flange 85 which is connected to flange tube 84. FIG. 13b is a perspective view of this first stage of construction of flanged tubular fishing float 83. Flange 85 is seen running down the entire length of flange tube 84.

Figure 13D:
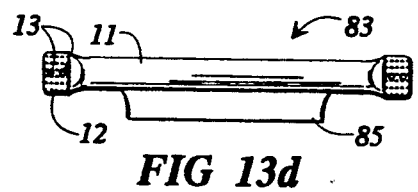
Figure 13C:
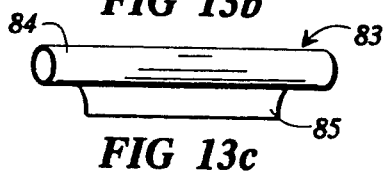

Flange 85 is then trimmed away as shown in FIG. 13c. End sections 12 and attachment holes 13 are also formed on flange tube 84 in a manner similar to that discussed with respect to the preferred embodiment of the present invention and shown in FIG. 13d. Of course, any type of end section or attachment device previously discussed is within the scope of the present invention, including slits which would allow quick attachment.

Figure 13E:
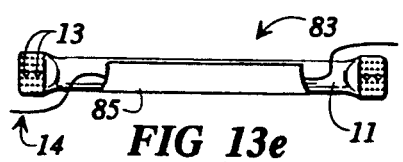
FIG. 13e is a side view of the fourth stage of construction of the flanged tubular fishing float shown in FIG. 13a with a fishing line attached.

Flange 85 is then biased around center section 11 as is seen in FIG. 13e. This biasing is accomplished by rotating flanged tubular fishing float 83 through a heated tube which softens the material of flange 85 and forms it around center section 11. Flanged tubular fishing float 83 is then cooled in the form shown in FIG. 13e. Fishing line 14 may be rapidly inserted between flange 85 and center section 11 at a point along fishing line 14 which corresponds to a desired fishing depth. The bias creates a grip of fishing line 14 to prevent flanged tubular fishing float 83 from moving along fishing line 14. If a more secure grip is desired, fishing line 14 may be threaded through attachment holes 13, as discussed above. It should also be clear that attachment holes 13 are not necessary if an adequate grip is available from flange 85. The thickness of flange 85 is variable to achieve variations in grip strength.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below.

I claim:

1. A tubular float for attachment to a fishing line, said tubular float comprising:
   an extended tubular center section;
   two end sections enclosing said center section; and
   a flange connected outside and axially along said tubular center section, said flange biased against said tubular center section.

2. A tubular float for attachment to a fishing line, said tubular float comprising:
   an extended tubular center section; and
   two end sections enclosing said center section, each of said end sections including an attachment means for attachment of a fishing line and defining a knurled section of sealed tubing, said tubing composed of the same material as that of said center section.

3. A tubular float for attachment to a fishing line, said tubular float comprising:
   an extended tubular center section; and
   two end sections enclosing said center section, each of said end sections including an attachment means for attachment of a fishing line, said attachment including, at least, a hole passing through said end section and a slit extending from said hole.

4. A tubular float for attachment to a fishing line, said tubular float comprising:
   an extended tubular center section; and
   two end sections enclosing said center section, each of said end sections including an attachment means for attachment of a fishing line, said attachment means including, at least, a slit which extends from an edge of said end section and through a turn to a point at which an attached fishing line would normally remain within said slit.

5. A tubular float for attachment to a fishing line, said tubular float comprising:
   an extended tubular center section; and
   two end sections enclosing said center section, each of said end sections including an attachment means for attachment of a fishing line and defining a plurality of tubing compartments separated by line seals and including said attachment means, whereby said compartments and said line seals resemble hills and valleys respectively.

6. A tubular float for attachment to a fishing line, said tubular float comprising:
   an extended tubular center section; and
   two end sections enclosing said center section, each of said end sections including an attachment means for attachment of a fishing line and defining folded portions of tubing which overlap and include said attachment means constructed through said overlapped portions, wherein said attachment means draws strength against deformation from said folded portions.

7. A tubular float for attachment to a fishing line, said tubular float comprising:
   an extended tubular center section; and
   two end sections enclosing said center section, each of said end sections including, at least, an attachment means including sealed tubing with a slit and composed of the same material as that of said center section and turned to resemble a pig tail.

8. Method of manufacturing a tubular float for attachment to a fishing line, said method comprising the steps of:
   forming a hollow cylinder including two open ends;
   sealing the two open ends of the cylinder to create an air-tight enclosure within the cylinder and to create two end sections, including
      clamping each open end of the hollow cylinder to apply pressure to the flattened end section,
      applying energy waves to effect a complete seal, and knurling the two end sections; and
   opening a portion of each of the end sections through which a fishing line may be threaded, which opening leaves the enclosure air-tight.

9. Method of manufacturing a tubular float for attachment to a fishing line, said method comprising the steps of:
   forming a hollow cylinder including two open ends;
   sealing the two open ends of the cylinder to create an air-tight enclosure within the cylinder and to create two end sections; and
   opening a portion of each of the end sections through which a fishing line may be threaded, which opening leaves the enclosure air-tight, including opening a slot in at least one of the end sections.

10. Method of manufacturing a tubular float for attachment to a fishing line, said method comprising the steps of:
    forming a hollow cylinder including two open ends;
    sealing the two open ends of the cylinder to create an air-tight enclosure within the cylinder and to create two end sections;
    folding portions of the end sections over themselves to create an overlap region through which openings may be created; and
    opening a portion of each of the end sections through which a fishing line may be threaded, which opening leaves the enclosure air-tight.

11. Method of manufacturing a tubular float for attachment to a fishing line, said method comprising the steps of:
    forming a hollow cylinder including two open ends;
    sealing the two open ends of the cylinder to create an air-tight enclosure within the cylinder and to create two end sections;
    opening a portion of each of the end sections through which a fishing line may be threaded, which opening leaves the enclosure air-tight; and
    spin welding each end section to create an end section in the shape of a pig-tail.

* * * * *